UNITED STATES PATENT OFFICE.

MAX BUCHNER, OF HEIDELBERG, GERMANY, ASSIGNOR, BY MESNE ASSIGNMENTS, TO THE CHEMICAL FOUNDATION, INC., A CORPORATION OF DELAWARE.

MANUFACTURE OF METAL HYDROXIDS.

1,337,192.  Specification of Letters Patent.  Patented Apr. 20, 1920.

No Drawing. Application filed August 26, 1915, Serial No. 47,487. Renewed June 26, 1919. Serial No. 306,801½.

*To all whom it may concern:*

Be it known that I, Dr. MAX BUCHNER, a subject of the Emperor of Germany, and a resident of Heidelberg, Germany, have invented certain new and useful Improvements in the Manufacture of Metal Hydroxids; and I do hereby declare the following to be a full, clear, and exact description of the invention, such as will enable others skilled in the art to which it appertains to make and use the same.

My invention relates to the manufacture of metal-hydroxids, and more particularly to the hydroxid of aluminum in such a physical state as to be readily filterable and readily washable. The invention is particularly applicable to aluminum salts, since it permits the production of aluminum hydroxid in a readily workable and very valuable form, free from basic combinations. Furthermore, the precipitates are low in water content, only small quantities of washing water are required to be used, and are free from soluble metal combinations.

The new process comprises the utilization of metal salts capable of forming hydrates either in solution or in a solid state, which are treated with concentrated ammonia in excess, and the resulting reaction liquor containing the ammonia salts formed by the reaction, is readily drawn off from the hydroxid precipitate. This liquor is then enriched with ammonia, to be again used as a reagent or precipitating means.

This repeated use is continued until the reagent or precipitating liquid has been sufficiently saturated or enriched to permit the crystallizing out of the ammonia salts.

The repeatedly used liquor formed during the process requires but very slight evaporation to separate the ammonia salts in solid form.

As a precipitant I use concentrated aqueous or liquid ammonia in such quantity that there is an excess of $NH_3$ present, and it is advantageous to operate with several or successive volumes of ammonia. The enriching or regeneration of the liquor, after the reaction between the concentrated excess of ammonia and the metal salts, and after it has been drawn off the hydroxid precipitate, is accomplished by adding highly concentrated aqua ammonia, liquid ammonia, or by the introduction of ammonia gas. In the latter case, pure ammonia gas may be used, or residual gases containing ammonia.

Instead of enriching the resulting liquor freed from metal hydroxid precipitate before its re-use, this liquor may be directly applied to a fresh quantity of metal salts and then enriched by introducing into the mixture ammonia gas from any source, that is, pure ammonia, or waste gases containing ammonia.

The metal salt solution is advantageously a saturated one.

Solid metal salts may be used either in a pulverulent form, lumps or other form, with or without water of crystallization therein. Under some circumstances the salt may be freed from its water of crystallization by heating, or it may be melted in its water of crystallization. Then the melted salt is immediately brought into contact with highly concentrated ammonia in excess, or with enriched residual liquor. Of special value is the use of metal salts in lumps which are converted with certainty into readily washable, thick precipitates, free from basic combinations and poor in water.

In addition to ammonium, its organic derivatives may be used as precipitants, for example, anilin, ammonia combinations of the weak acids, such as ammonium carbonate, and ammonium sulfid. As heretofore stated, gaseous ammonia may be used in the form of waste gases containing ammonia, such as Mond gas, coke-oven gas, etc.

Instead of flowing the liquid ammonia into the metal salt solution or over the solid metal salt, the reverse may be done. The metal salt may thus be introduced into an excess of saturated aqueous ammonia, or be introduced into the residual liquor after enrichment, as heretofore stated. In any case, the quantity of ammonia must be in excess, and advantageously many times the volume theoretically required. The use of an excess of ammonia, several times the quantity required for the reaction, produces a decidedly different product from a case where the ammonia is present in amounts only sufficient to maintain the solution of alkaline. The product is more readily and immediately filterable, and not gelatinous.

The introduction into the saturated metal salt solution of solid or molten metallic salts, is not done all at once, but small portions are added from time to time. In this case also, in place of actual ammonia, its organic derivatives or its combinations with weak acids may be used. The process may be carried out with chemically pure metal salts, alone or mingled, or with impure salts; for example, in the latter case with impure aluminum sulfate, such as is obtained in dissolving clays.

When operating in the manner indicated, the saturated ammonia liquor, or the regenerated liquor, and the metal salt to be acted upon are brought directly together, but the operation may also be carried out with a porous partition separating the reagent liquid from the metal salt, whether the salt be in solution or in a solid form. In this manner the transformation (from ammonia combination to hydroxid) and the purification of the metal hydroxid is accomplished by osmosis. This process is a continuous one, if on the one side of the porous partition solid salt is added from time to time, and on the other side of the partition ammonia from any source is continuously supplied to the liquid. The metal hydroxid precipitate is then removed from time to time. The ammonium salt disengaged from the enriched liquor also can be removed from time to time.

As a specific example, a very useful pasty, readily cleaned precipitate is obtained if one kilo of aluminum sulfate be treated with four liters of aqua ammonia containing 150 to 160 gr. of $NH_3$ to the liter. If the metal salt to be precipitated is not all supplied at once but is added in small quantities from time to time the filtrate or resulting liquor may be used again, in order to save ammonia. Even if the resulting ammonium sulfate liquor is heavily charged with the salt it is still capable of taking up considerable quantities of ammonia, so that by introducing ammonia gas it is quickly regenerated for further operations.

Furthermore, the process as above explained may be carried out so that the filtrate or ammonium sulfate liquor containing ammonia in solution is immediately brought into contact with fresh quantities of metallic salts, and during the reaction gaseous ammonia is introduced.

The reaction between ammonia and aluminum salt may be carried out warm as well as cold, and even if it is carried out in the cold, reaction is completed in a very short time, and it is remarkable that from lumps the leaching or removal of the aluminum sulfate takes place very quickly. It is advantageous to so position the pieces of material that they will be acted upon readily by the ammoniacal liquor from all sides, and that the material to be acted upon lies sufficiently high in the bath, so that the ammoniacal liquor can readily flow off.

As above indicated, the chemical and physical properties of the precipitate cause a reduction in the water content of the liquor, and if this reduction of water content is noted to any great degree, it is advantageous to add water from time to time to replace the water lost in the precipitate. With the use of solid aluminum sulfate, as well as with the use of concentrated solutions, water of crystallization on the one hand, and solution water on the other hand is introduced into the reaction mixture, in order to balance the mixture.

Finally, the concentration of the metal salt solution, or the aluminum salt solution, must be considered. This must be high enough to precipitate the metal hydroxid, especially aluminum hydroxid, not in a gelatinous condition, but rather in pasty condition. The minimum concentration is to be tested in different salts during the process, and is to be fixed by such tests. It is to be noted that with the use of solid metal salts or aluminum salts that contain water of crystallization, as well as with such salts that have been dehydrated, a relatively fine granular, rapidly filterable precipitate is obtained.

According to the present process all the metal salts, and especially aluminum salts that can be converted into hydroxids may be used, and the process is suitable for the manufacture of aluminum hydroxids from pure or impure aluminum salts, such as are obtained by the action of acids on aluminum containing materials, especially with sulfuric acid. In this case the mentioned aluminum salts are filtered off from the insoluble silica residues, and by evaporation of the water are highly concentrated or saturated to such an extent that the aluminum salts will crystallize out. Naturally, these are mixed with iron and other salt impurities.

When operating by dialyses with a porous partition, the process is carried out as follows:

In a vessel containing strong or saturated aqueous ammonia, is inserted a porous cell, or other readily permeable partition wall, for example, a frame containing a stretched fabric, and in the interior thereof is placed an aluminum salt solution or solid salt. The liquid entering the precipitating chamber thus made, immediately reacts upon the aluminum salt and there is produced, for example, from aluminum sulfate and ammonia, ammonium sulfate and aluminum hydroxid. The latter remains in the porous compartment or cell, while the ammonium sulfate passes out as the ammonia enters in a contrary direction according to the requirement for the reactions.

It is remarkable that with the use of a solid salt as well as with the salt solution and an excess pressure in the porous cell, that the precipitate does not hinder the passage of the solutions. It is advantageous to operate with an over pressure on the precipitant, whereby the reaction is accelerated, and naturally during the whole process with an excess of precipitant.

In order to free the hydroxid precipitate from the residues of reaction salts, the cell is removed, and the contents placed in a suction apparatus, or in a filter press, and then washed. The residual solution after being again saturated with ammonia is re-used.

In order to hasten the reaction, precipitant may be added on both sides of the porous partition, but it is preferable to introduce salt on one side of the partition wall and ammonia on the other side of the partition wall into the precipitating or reagent liquor.

With the repeated use of the liquor and the consequent continuous addition thereto of precipitating medium and salt on opposite sides of the partition wall, the process is a completely continuous one, the salt being alternately introduced and the precipitate removed, while on the exterior ammonia is added and the separated ammonium salt removed.

I claim—

1. Process of producing metal hydroxids in readily filterable and readily washable form, which comprises reacting on a metal salt capable of forming a hydrate with concentrated ammonia several times in excess of the quantity required for the reaction, and removing the reaction liquor with the ammonium salts formed, and immediately using said liquor for reacting on a new quantity of salt while introducing ammonia gas thereinto.

2. Process of producing metal hydroxids in readily filterable and readily washable form, which comprises reacting on metal salt in lumps capable of forming a hydrate with concentrated ammonia several times in excess of the quantity required for the reaction, and removing the reaction liquor with the ammonium salts formed, and immediately using said liquor for reacting on a new quantity of salt while introducing ammonia gas thereinto.

3. Process of producing metal hydroxids in readily filterable and readily washable form, which comprises reacting on metal salts capable of forming hydrates with ammonia several times in excess of the quantity required for the reaction, adding salt from time to time and adding ammonia from time to time, removing the reaction liquor with the ammonium salts formed and adding ammonia sufficient to restore the strength of the solution for reintroduction into the cycle of operations.

4. Process of producing metal hydroxids in readily filterable and readily washable form, which comprises reacting through a porous diaphragm on a metal salt capable of forming hydrate with ammonia several times in excess of the quantity required for the reaction, adding salt from time to time, and adding ammonia from time to time, removing the reaction liquor with the ammonium salts formed, and regenerating the liquor in ammonia for re-introduction into the cycle of operations.

5. Process of producing metal hydroxids in readily filterable and readily washable form, which comprises reacting through a porous diaphragm on a metal salt capable of forming a hydrate with a solution of ammonia several times in excess of the quantity required for the reaction, and maintaining a supply of salt on one side of the diaphragm and a supply of ammonia on the other side of the diaphragm.

In testimony that I claim the foregoing as my invention, I have signed my name in presence of two subscribing witnesses.

Dr. MAX BUCHNER.

Witnesses:
 HENRY HASPER,
 ARTHUR SCHROEDER.